United States Patent [19]

Kroekel

[11] E Re. 29,915

[45] Reissued Feb. 20, 1979

[54] UNSATURATED POLYESTER RESINS CONTAINING CELLULOSE ESTER AND MOLDED ARTICLES THEREFROM

[75] Inventor: Charles H. Kroekel, Churchville, Pa.

[73] Assignee: Rohm and Haas Company, Philadelphia, Pa.

[21] Appl. No.: 335,999

[22] Filed: Feb. 26, 1973

Related U.S. Patent Documents

Reissue of:

[64] Patent No.: 3,642,672
Issued: Feb. 15, 1972
Appl. No.: 878,920
Filed: Nov. 21, 1969

U.S. Applications:

[63] Continuation-in-part of Ser. No. 566,580, Jul. 20, 1966.

[51] Int. Cl.[2] ..... C08L 1/10; C08L 1/14

[52] U.S. Cl. ..... 260/16; 260/862

[58] Field of Search ..... 260/16

[56] References Cited

U.S. PATENT DOCUMENTS

| | | | |
|---|---|---|---|
| 2,423,823 | 6/1943 | Baker | 260/16 |
| 2,646,410 | 7/1953 | Kneisley | 260/16 |
| 2,830,966 | 4/1958 | Petropoulos | 260/16 |
| 3,078,249 | 2/1963 | Russell | 260/860 |

FOREIGN PATENT DOCUMENTS

| | | | |
|---|---|---|---|
| 639685 | 4/1962 | Canada | 260/16 |
| 936351 | 9/1963 | United Kingdom | 260/862 |

OTHER PUBLICATIONS

Chem. Absts., vol. 66:19949*a*, Baticle, "Use of CAB . . . Polyester."

Chem. Absts., vol. 67:109198*e*, Puest, "Glass-Fiber . . . Polyester . . . Lacq."

Chem. Absts., vol. 69:44671*y*, Goetz, "Glass-Fiber . . . Compositions."

*Primary Examiner*—Edward M. Woodberry
*Attorney, Agent, or Firm*—Michael B. Fein

[57] ABSTRACT

This invention provides a liquid, polymerizable composition of matter, suitable for molding fibrous reinforced articles with exceptionally smooth surfaces, said composition being curable under heat and pressure to form a rigid, cured product which is characterized by an optically heterogeneous appearance. The composition comprises a thermoplastic cellulose ester, and $\alpha,\beta$-ethylenically unsaturated polymerizable polyester having a molecular weight per double bond factor of 150 to 186, and a monomer containing a $CH_2{=}C<$ group copolymerizable with the unsaturated polyester.

31 Claims, No Drawings

UNSATURATED POLYESTER RESINS CONTAINING CELLULOSE ESTER AND MOLDED ARTICLES THEREFROM

Matter enclosed in heavy brackets [ ] appears in the original patent but forms no part of this reissue specification; matter printed in italics indicates the additions made by reissue.

This application is a continuation-in-part of pending application Ser. No. 566,580, filed July 20, 1966.

This invention is concerned with polymerizable resinous compositions (based on unsaturated polyesters) which exhibit little or no volume shrinkage when cured, and which, as a result, yield glass fiber reinforced or other fibrous reinforced articles with exceptionally smooth surfaces when cured under the usual conditions of heat and pressure.

The use of unsaturated polyester resins in the molding of glass fiber reinforced or other fiber reinforced products enjoys broad application in the manufacture of such products as automobile bodies, chairs, heater housings, trays, etc. Some of the advantages of such products over metal include light weight, high strength to weight ratio, resistance to corrosion, and part design flexibility. A significant disadvantage of prior art products is that they have rough and undulating surfaces exhibiting a characteristic pattern of the reinforcing fibers. The rough surfaces are attributable, at least in part, to the shrinkage in volume which occurs as the resin polymerizes. While this may not be the only factor contributing to the poor surface smoothness of the moldings, it is thought to be a predominant factor.

Many applications for which fiber reinforced resinous laminates are used are not critical with respect to surface smoothness, but in certain uses such as automobile surface parts for example, the characteristic rough surface is objectionable. Techniques useful for improv- ng smoothness of glass fiber reinforced moldings which find limited utility include the use of resin-rich gel coats or veil-like glass fiber surfacing mats. In both instances a resin-rich surface is obtained which serves to submerge the reinforcing glass strands and make them less noticeable. These techniques add processing steps and/or cost to the production of the articles and do not completely eliminate the surface deficiencies.

Often it is desirable to paint moldings used in automotive applications, for example, to achieve a smooth, metal-like, high-gloss appearance. In order to accomplish this it is common practice to resort to time and manpower-consuming dry sanding operations to improve the surface smoothness before applying the finish coating. Such a surface correcting technique is used in the present production of glass fiber reinforced polyester automobile bodies. In this application the cost of the dry sanding is a substantial factor in the overall cost of finishing the automobile bodies.

The present invention avoids the application of resin-rich gel coats or expensive and time-consuming sanding or other mechanical pre-finishing operations. By utilizing the compositions, as hereinafter more fully described, articles are produced which have a high degree of surface smoothness, sufficient in most instances to allow direct application of a protective and decorative coating such as paint, lacquer, etc., and which produce faithfully and with high fidelity the mold design with which they may have been made. These objectives are achieved by utilizing a polymerizable resinous composition which consists essentially of (1) a polycondensation product of an $\alpha,\beta$-ethylenically unsaturated dicarboxylic acid and a dihydric alcohol, (2) a thermoplastic cellulose ester polymer (hereinafter referred as cellulose ester), and (3) a monomeric liquid substance having at least one polymerizable $CH_2{=}C<$ group and in which the foregoing ingredients are soluble. The two polymeric ingredients may or may not be compatible when dissolved in the liquid monomer and blended; however, the composition must be such that upon crosslinking under the usual conditions of heat and pressure an optically heterogeneous, nearly opaque product, or opaque product, is formed which, when examined microscopically, exhibits a definite two-phase structure indicative of incompatibility. The compositions where the two polymeric ingredients are compatible when dissolved in the liquid monomer and blended are preferred. Advantages obtained with this one-phase liquid resin system include ease of processing, reduced tendency of separation when mixed into molding compositions, such as in chemically thickened molding compositions, and improved physical characteristics.

The invention is based upon the discovery that through the use of specific combinations of the three components described above the overall polymerization shrinkage is at most very low. Conventional unsaturated polyester/monomer resins exhibit about 7 to 10 percent volume shrinkage on cure. The composition of my invention shrink at most about 5 percent by volume while in many instances expansion of up to about 10 percent takes place upon curing. Although it is not our intent to be bound by any particular mechanism for this unusual behavior, it has been noted that there is a definite relationship between the observed heterogeneity or incompatibility of the cured compositions and the phenomenon of low shrinkage and/or expansion on cure. The reduction or elimination of cure shrinkage in the polymerizing resinous compositions of this invention manifests itself in glass fiber reinforced molding to the extent that the surfaces of the cured composites are extremely smooth and devoid of fiber prominence, thereby achieving a degree of surface quality and mold surface reproduction unattainable with liquid polymerizable resinous compositions of the prior art.

The compositions described herein may be used in premix and preform or mat molding applications well known in the art. In the case of premix molding liquid resins are intimately mixed with inert particulate fillers, chopped glass or other varieties of fibers, colorants or pigments, release agents, chemical thickeners, and polymerization initiators in an intensive mixer. The resulting doughlike mass is easily handled and is charged in weighed quantities to a matched metal die mold maintained at an elevated temperature (212 to 350° F.) and pressure applied (100 to 1500 p.s.i.) for a period of 15 seconds to fifteen minutes to effect cross-linking of the resin to form a rigid, cured product which is ejected hot from the mold. In preform or mat molding the resin may be used in the neat form or mixed with inert particulate fillers (maintaining a fluid consistency). Glass fiber fabrics may also be used either alone or in combinations with glass fiber mats. Colorants, pigments, release agents and polymerization initiators are also incorporated into the mixtures. The fluid mixture is poured over preformed chopped glass strands or chopped or continuous strand glass fiber mat each of which may contain a polymeric binder, and placed in a matched metal die mold where flow of the resin mixture is accomplished and the crosslinking reaction affected under condition of moderate heat and pressure (see above under premix).

Useful premix formulations may cover a wide range of compositions as follows:

| | Parts by weight |
|---|---|
| Resin | 15–60 |
| Fillers | 20–75 |
| Reinforcing fibers | 5–40 |

In preform moldings the resin may be used in the neat form or mixed with fillers (up to 70 percent by weight of filler). Reinforcing fiber content of preform-type moldings may be varied from 5 to 60 parts by weight of the cured composite.

DESCRIPTION OF COMPOSITION

(1) Unsaturated polyester

Of the three principal components of the invention the unsaturated polyester is the most critical with respect to chemical structure limitations. The polyester is used in amounts ranging from 20 to 70 parts by weight of the total three component resinous system, and preferably in amounts ranging from 30 to 50 parts by weight. The class of unsaturated polyesters in itself is not unique and methods of preparing them are well known. Such polyesters may be prepared by condensing an $\alpha,\beta$-ethylenically unsaturated dicarboxylic acid or anhydride or mixtures thereof with a dihydric alcohol or mixtures of dihydric alcohols. (The term dicarboxylic acid is intended to include anhydrides of the acids which form anhydrides.) Preferred examples of unsaturated dicarboxylic acids which may be used are maleic or fumaric acids; however, citraconic, chloromaleic acids and the like may have value in certain instances. A minor proportion of the unsaturated acid, up to about 25 mole percent, may be replaced by saturated dicarboxylic acids, examples of which are orthophthalic, isophthalic, terephthalic, succinic, adipic, sebacic, methylsuccinic acids and the like. It is preferred that the carboxylic acid present in the polyester of this invention be entirely an unsaturated variety as the maximum crosslinking potential represented by such polyesters plays an important role in the performance of the three component resinous composition. Dihydric alcohols that are useful in preparing the polyesters include 1,2-propanediol (hereinafter referred to as propylene glycol), dipropylene glycol, diethylene glycol, 1,3-butanediol, and the like.

Unsaturated linear polyesters useful in the present compositions can be further defined in terms of degree of unsaturation. The polyester chain molecular weight per double bond (or repeating unit) provides a convenient means of numerically defining the degree of unsaturation of a given polyester. Unsaturated polyesters which have M.W./—C=C— (molecular weight to carbon, carbon double bond) factors of about 150 to about 186 are of primary interest in this invention. Fumaric or maleic based polyesters are preferred because of their effectiveness in the three component systems. Examples of suitable unsaturated polyesters are the polycondensation products of (1) propylene glycol and maleic or fumaric acids; (2) 1,3-butanediol and maleic or fumaric acids; (3) combinations of ethylene and propylene glycols (50 mole percent or less of ethylene glycol) with maleic or fumaric acids; (4) combinations of propylene glycol and of dipropylene glycol (50 mole percent or less of the latter) with maleic or fumaric acids; and (5) diethylene glycol and maleic or fumaric acids. These examples are intended to be illustrative of suitable polyesters and are not intended to be all-inclusive.

The acid number to which the polymerizable unsaturated polyesters are condensed is not particularly critical with respect to the ability of the three component system to cure to the desired imcompatible product. Polyesters having been condensed to acid numbers of less than 100 are generally useful, but acid numbers less than 70 are preferred. The molecular weight of the polymerizable unsaturated polyester may vary over a considerable range, but ordinarily those polyesters useful in the practice of the present invention have a molecular weight ranging from about 500 to 5000, and more preferably, from about 700 to about 2000.

(2) Cellulose ester

Compositions of the invention contain at least one cellulose ester, such as but not limited to cellulose acetate butyrate, cellulose acetate propionate and the like. The cellulose esters used may or may not yield liquid compatible mixtures when combined with the unsaturated polyester in monomer solution. Those mixtures which tend to separate into two liquid layers on long term standing are operative if the phases are mixed thoroughly just before the resin is used; for example, in premix or preform molding processes. It is required that when the subject three component liquid compositions (whether compatible or not) are cured under heat and pressure, the cured mass must remain or become incompatible for the phenomena of low shrinkage or expansion to take place. The gross incompatibility of the cured compositions is seen when samples are examined microscopically, with reflected light, for example, at 400 to 600×, or at higher magnification, and takes the form of a distinct two phase structure consisting typically of white or off-white spheres dispersed in a clear matrix.

A method for determination of optical heterogeneity which provides a quantitative tool for choosing the several components so that the purposes of preferred embodiments of this invention are achieved involves the preparation of a ⅛ inch thick casting of the monomer system with the thermoplastic polymer intermixed therein. The optical heterogeneity of these monomer/thermoplastic polymer castings may be determined by measurement of the total white light transmittance (TWLT). Where such castings yield a TWLT less than 50 percent the monomer/thermoplastic polymer mixture can be successfully used in the resin system of the present preferred embodiment of this invention. More preferred are those mixtures which yield a TWLT less than 35 percent, and even more preferred are those that yield a TWLT less than 25 percent. Most preferred are those monomer/thermoplastic polymer mixtures which yield a TWLT less than 15 percent.

The molecular weight of the cellulose esters useful in this invention may vary over a wide range. While certain molecular weight ranges are preferred for certain resin compositions, for certain molding compositions and for certain molding operations the molecular weight is not believed critical to the general advantages of this invention. The molecular weight of cellulosic esters is commonly rated by a solution viscosity, the standard technique being falling ball viscosity, ASTM D-1343-54T. Commercially available cellulose esters are offered in the viscosity range of less than 0.1 second to more than 20 seconds, but this present availability is the only major reason for preferring this range.

The cellulose esters useful in this invention are well-known materials. Cellulose esters are prepared by reactions of acids or more commonly anhydrides with the —OH groups along the cellulose polymer chain. The amount and type of substitution affects the solubility of the cellulose ester in the monomer system and in the monomer/unsaturated polyester solution of this invention, the processing and handling characteristics of the resin and molding compositions, or the physical characteristics of polymerized resin or the polymerized molding compositions.

The average number of hydroxyl groups per four anhydroglucose repeating unit along the cellulose chain that are not esterified generally varies from 0 to about 3. Preferred are those cellulosic esters having an average of 0 to about 2.5 un-esterified hydroxyl groups, and more preferred is the range of 0 to about 2. The size and type of the alkyl or aryl groups of the ester substitution may vary widely depending upon the amount of substitution, the overall composition of the resin, and the composition of the molding composition. There is no known limit to the size and type of the ester substitution, although the ester group commonly contains an average of about 1 to 10 carbon atoms. Typical acids and anhydrides useful in the preparation of cellulose esters include formic, acetic, propionic, butyric, hexanoic, decanoic, stearic, and the like. These alkyl esters may be branched or unbranched. Typical of suitable aromatic acids is benzoic acid. An embodiment of the invention utilizes cellulose esters where at least one ester group contains 2 to 7 carbon atoms. Also, of particular interest are those cellulosic esters wherein at least one ester group is alkyl containing 2 to 6 carbon atoms. Preferred are those cellulose esters where the esters are at least 25 percent alkyl esters containing 4 to 6 carbon atoms. Preferred ester groups are propionic, butyric, and isobutyric. Unsaturated esters of cellulose may also be utilized in this invention. An example of a suitable cellulosic ester is cellulose acetate butyrate, wherein 0 to about 2 hydroxyl groups are not esterified, and wherein at least 25 percent of the ester groups are butyrate.

The cellulose ester should be present in amounts ranging from 1 to 25 parts by weight based on the total three component resinous system. Preferred concentrations of cellulose ester are in the 2 to 20 parts by weight range, and more preferred are in the 5 to 20 parts by weight range.

(3) Monomer

The third essential constituent of the invention is a monomeric liquid substance (or mixture of monomers) having at least one polymerizable reactive $CH_2{=}C<$ group per molecule. The monomeric liquid substance must be copolymerizable with the unsaturated polyester and develop therewith a cross-linked or thermoset structure; it must also have the ability to dissolve the unsaturated polyester (1) above the cellulose ester (2) above or a mixture of polyester (1) and cellulose ester (2) over a wide range of concentrations. Examples are styrene, vinyl acetate and vinyl toluene either as the sole monomer or in combination with minor amounts (<50 percent by weight) or other monomeric substances such as lower alkyl esters of acrylic or methacrylic acids, chlorostyrene, 1,3-butanediol dimethacrylate, diallyl phthalate, and the like.

The monomeric liquid is used in amounts ranging from 30 to 70 parts by weight of the total three component resinous composition and preferably between 40 and 60 parts by weight.

When the resinous compositions of the present invention are to be cured, peroxidic or other conventional initiators are incorporated. Useful initiators include benzoyl peroxide, t-butyl peroctoate, di-t-butyl peroctoate, t-butyl perbenzoate, cyclohexanone peroxide, di-t-butyl peroxide, and the like. The initiators are added to the resin system just before the processing steps in amounts such that the compositions will remain fluid for the length of time required for processing. Useful concentrations of initiator range from 0.1 percent to 3 percent based on the three component resinous composition. Curing of the composition is carried out under heat and pressure, as heretofore noted, typically, in closed, preferably positive pressure type molds. Polymerization inhibitors and accelerators and mold release agents may be added to the compositions to perform their normal function, as is well understood in the art.

In the specification, the examples and the claims, all parts and percentages are by weight unless otherwise noted.

EXAMPLE 1

(a) A three-component resinous composition is prepared as follows: An unsaturated polyester, herein designated as (I), (prepared by esterifying 1.05 moles of propylene glycol with 1.0 mole of maleic anhydride to an acid number of 52—M.W./—C=C— factor of 156), cellulose acetate butyrate polymer designated as (II), with a butyryl content of 38 percent, an average of about one hydroxyl remaining per four anhydroglucose repeating unit, and ½ second viscosity, and styrene monomer. The components are blended to yield a clear liquid resinous composition of the following overall composition:

| | Parts | |
|---|---|---|
| Unsaturated polyester (I) | 37.5 | (III) |
| Cellulose ester (II) | 12.5 | |
| Styrene | 50.0 | |

(b) A resinous composition is prepared as in (a) except that the cellulose ester is omitted. The composition of this resin is

| | Parts | |
|---|---|---|
| Unsaturated polyester (I) | 37.5 | (IV) |
| Styrene | 50.0 | |

(c) For control purposes a conventional unsaturated polyester/styrene resin is selected, herein designated as (V). It is the polycondensation product of dipropylene glycol and maleic anhydride (1.05/1.0 mole ratio) having an acid number of 20 and is dissolved in styrene at 75 percent solids.

(d) Portions of resins (III), (IV), and (V) are cured in the neat form, using 1 percent t-butyl perbenzoate by weight as initiator, under positive pressure of 400 p.s.i. at 300° F. in a press. Cured resin (III) has a white, nearly opaque appearance to the naked eye, and microscopic examination (400× magnification) clearly shows it to have a two-phase, incompatible structure consisting of a clear continuous matrix in which are dispersed white spheres. Cured resins (IV) and (V) are essentially transparent, an appearance typical of cured unsaturated polyester/monomer resins known in the art. Volume changes which occur as a result of the polymerization are determined by measuring the specific gravities of the liquid and cured resins and using the equation:

$$\text{Percent volume shrinkage} = \frac{\text{S.G. cured} - \text{S.G. liquid}}{\text{S.G. cured}} \times 100$$

| Resin: | Percent volume shrinkage |
|---|---|
| (III) | [1] −0.5 |
| (IV) | 10.6 |
| (V) | 7.6 |

[1] 0.5% expansion.

The unusual behavior of (III) is illustrative of the compositions of the present invention and (IV) shows the pronounced effect of the removal of the cellulose ester. The shrinkage of (V) is typical of resins of the prior art.

(e) Glass fibermat moldings are made using (III), (IV), and (V) following procedures well known in the art. Tote box moldings 0.080 inch thick are made using two plies of 2 oz./ft.$^2$ continuous strand glass reinforcing mat and one ply of 10 mil glass surfacing mat at each surface. The following formulation is used.

| | Parts |
|---|---|
| Resin | 60 |
| Clay filled | 40 |

An initiator, t-butyl perbenzoate, is added at 0.5 percent based on the resin, and a release agent (Zelec UN, du Pont trademark) is added at 0.5 percent based on the total mix. Tote box moldings are made in a matched metal die mold using positive pressure (400 p.s.i.), at 300° F. and are cured for 90 seconds. The tote box made with (III) has extremely smooth surfaces free from the characteristic fiber prominence which is displaying by the tote boxes made with (IV) and (V). The surface roughness is measured on a Microcorder instrument (type RAD-26 Amplimeter, RAE-53-24 Recorder, RTK-18 Tracer), available from the Metrology Division of Bendix Corp., Southfield, Mich. Typical surface profile results on the moldings are:

| Preform-type molding: | Av. surface roughness[1] |
|---|---|
| Based on (III) | 125 |
| Based on (IV) | 1000-1500 |
| Based on (V) | 1360 |

[1] Microinches in ⅛" scan.

Acceptably smooth painted surfaces on the (III) based molding can be obtained without using any surface preparation, while the (IV) and (V) based moldings require extensive corrective dry sanding before painting in order to obtain an acceptable finish.

EXAMPLE 2

As unsaturated polyester (I) as described in Example 1 is dissolved in styrene at 62.5 percent solids. The cellulose ester (II), also described in Example 1, is dissolved at 25 percent solids in a methyl methacrylate-styrene monomer mixture (½ ratio). Sixty parts of the polyester/styrene solution is blended with 40 parts of the styrene-methyl methacrylate solution of the cellulose ester to yield a clear resin having an overall composition, herein designated as (VI), as follows: unsaturated polyester/cellulose ester/styrene/methyl methacrylate — 37.5/10.0/42.5/10.0 parts. Resin (VI) may be used in the procedure of Example 1(e) to obtain good results.

EXAMPLE 3

Cellulose acetate butyrate polymers (CAB) that may be used in this invention include those characterized in the following table:

| Designation | Approx. average Number of hydroxyl groups remaining per repeating unit | Butyryl content (percent) | Falling ball viscosity (seconds) |
|---|---|---|---|
| a | 1 | 17 | 2 |
| b | 2 | 27 | 3 |
| c | 1 | 28 | 0.5 |
| d | 1 | 38 | 2 |
| e | 0 | 50 | 1 |

A clear liquid resin is obtained by blending 39 parts polyester (I) from Example 1(a), 6 parts 3(b) above, and 55 parts styrene monomer. Polymerization of this resin yields a shrinkage of 4.5 percent. As the falling ball viscosity (molecular weight) of the CAB is increased, the butyryl content of the CAB is reduced, or the concentration of the CAB in the resin is increased, the handling characteristics of liquid resin becomes poorer. A clear resin of 39 parts (I), 12 parts 3(e), and 49 parts styrene yields an expansion of 2.0 percent when polymerized under heat and pressure to a heterogeneous mass.

Useful unsaturated polyesters include the esterification product of 1.05 moles, 1,3-butane diol and 1.0 mole maleic anhydride. Unsuitable are less highly unsaturated polyesters such as the esterification product of 2.1 moles 1,2-propane diol, 1.0 mole orthophthalic acid, and 1.0 mole maleic anhydride. Monomer systems containing vinyl toluene and vinyl acetate are suitable.

The term "optically heterogenous," as used in the specification and claims refers to the appearance of the cured, polymerizable composition. Without magnification, that is to the naked eye, the appearance of the cured, neat (i.e., unfilled and unreinforced) composition generally appears white, off-white, or white with grey areas. Polymerized castings of the neat resin are approximately 1/10 inch thick and are viewed with reflected light. The cured composition of Example 1(a) is white indicating heterogeneity. Modifications of the unsaturated polyester, the cellulosic ester and the monomer system affect the translucency of the castings. Polymerizer castings of the neat resins of Examples 1(b) and 1(c) are clear. Under 600× magnification, using reflected light an a dark background, the optically heterogeneous cured composition appears as a distinct two-phase system or structure characterized by white, off-white, or white and grey spheres dispersed in a clear matrix.

It has been determined that the spheres which are dispersed in the clear matrix are essentially made up of the cellulose ester in the polymerized monomer, while the matrix is essentially the crosslinked copolymer resulting from the copolymerization of the unsaturated polyester and the crosslinking monomer containing at least one reactive $CH_2{=}C<$ group per molecule, as hereinbefore defined. Thus, the cellulose esters which are useful in the present invention are those which are incompatible or essentially incompatible with the copolymer of the unsaturated polyester and the crosslinking monomer containing at least one polymerizable reactive $CH_2{=}C<$ group per molecule.

Calculation of the molecular weight per double bond factor (M.W./—C=C—), referred to in the specification and claims, is illustrated below for the unsaturated polyester of Example 1(a); i.e., based on maleic anhydride and propylene glycol. The molecular weight of maleic anhydride is 98, the molecular weight of propylene glycol is 76; the sum of these two members is 174 and subtracting therefrom the molecular weight (M.W.=18) of one mole of water which is split out during the condensation reaction, gives the value of 156 for the factor. Fillers, usually inert and inorganic material useful with the compositions of the present invention include, for example, clay, talc, calcium carbonate, silica, calcium silicate, etc. "Reinforcing fibers" or "fibrous reinforcement" as used in the specification and claims is taken to mean glass fibers in one form or another, such as glass fabrics, chopped glass strands, chopped or continuous strand glass fiber mat; however, the terms also include reinforcing agents which, while less effective, may also be used if desired, for example, asbestos, cotton, synthetic organic fibers, and metals.

What is claimed is:

1. A liquid, polymerizable composition of matter, suitable for molding fibrous reinforced articles with a smooth surface, said composition being curable under heat and pressure to form a rigid, cured product which is characterized by an optically heterogeneous appearance, comprising per 100 parts by weight (a) 20 to 70 parts of an $\alpha,\beta$-ethylenically unsaturated polymerizable polyester having a molecular weight per double bond factor of 150 to 186, said polyester prepared by condensation of one or more $\alpha,\beta$-ethylenically unsaturated dicarboxylic acids with one or more dihydric alcohols, (b) 25 to 75 parts of a monomer containing a $CH_2{=}C<$ group copolymerizable with said unsaturated polyester, and (c) 1 to 25 parts of a cellulose ester that, when present during the copolymerization of (a) and (b), yields an optically heterogeneous cured composition, the sum total of (a), (b) and (c) being 100 parts by weight.

2. The liquid, polymerizable composition of matter, of claim 1 wherein the cellulose ester (c) is soluble in monomer (b) or in a solution of unsaturated polyester (a) in monomer (b).

3. The liquid, polymerizable composition of matter, of claim 1 wherein at least 25 percent by weight of the ester groups of cellulose ester (c) contain 4 to 6 carbon atoms.

4. The liquid, polymerizable composition of matter, of claim 1 wherein cellulose ester (c) is cellulose acetate butyrate.

5. The liquid, polymerizable composition of matter, of claim 4 wherein the ester groups of the cellulose acetate butyrate are at least 25 percent butyryl.

6. A liquid, polymerizable composition of matter, according to claim 1 which, upon curing, undergoes a volumetric change within the range of 10 percent expansion by volume to 5 percent shrinkage by volume.

7. A liquid, polymerizable composition of matter, according to claim 1 wherein the unsaturated polymerizable polyester is a condensation product of an $\alpha,\beta$-ethylenically unsaturated dicarboxylic acid with a dihydric alcohol.

8. A liquid, polymerizable composition of matter, according to claim 7 wherein a minor proportion of the unsaturated acid is replaced by a saturated dicarboxylic acid selected from the group consisting of orthophthalic acid, isophthalic acid, terephthalic acid, succinic acid, sebacic acid, adipic and methylsuccinic acids.

9. A liquid, polymerizable composition of matter, according to claim 8 wherein the unsaturated dicarboxylic acid is selected from the group consisting of maleic and fumaric acids and the dihydric alcohol is selected from the group consisting of propylene glycol, 1,3-butanediol, diethylene glycol, a mixture of ethylene and propylene glycol containing at least 50 mole percent propylene glycol and a mixture of propylene glycol and dipropylene glycol containing at least 50 mole percent propylene glycol.

10. A liquid, polymerizable composition of matter, according to claim 1 wherein the unsaturated polymerizable polyester (a) is the condensation product of propylene glycol and maleic anhydride, the monomer (b) is styrene and the thermoplastic (c) is cellulose acetate butyrate.

11. The rigid, cured product of the composition of claim 1.

12. The rigid, cured product of the composition of claim 10.

13. A rigid, smooth-surfaced article, containing fibrous glass reinforcement and crosslinked, polymerized mass obtained by curing under heat and pressure a mixture comprising for each 100 parts by weight.

(a) 20 to 70 parts of an $\alpha,\beta$-ethylenically unsaturated polymerizable polyester having a molecular weight per double bond factor of 150 to 186, said polyester prepared by condensation of one or more $\alpha,\beta$-ethylenically unsaturated dicarboxylic acids with one or more dihydric alcohols, (b) 25 to 75 parts of a monomer containing a $$CH_2{=}C<$$

group copolymerizable with said unsaturated polyester and (c) 1 to 25 parts of a cellulose ester which is soluble in monomer (b) or a solution of unsaturated polyester (a) in monomer (b), but which, when present during the copolymerization of (a) and (b), yields an optically heterogeneous cured composition, the sum total of (a), (b) and (c) being 100 parts by weight.

14. An article according to claim 13, in which the fibrous glass reinforcement is present in an amount of from 5 to 70 percent by weight of the total weight of the article.

15. An article according to claim 14, in which there is also present an inert, inorganic filler.

16. A method of producing a fibrous reinforced article with smooth surfaces which comprises providing a liquid, polymerizable composition of matter comprising (a) 20 to 70 parts by weight of an $\alpha,\beta$-ethylenically unsaturated polymerizable polyester having a molecular weight per double bond factor of 150 to 186, said polyester prepared by condensation of one or more $\alpha,\beta$-ethylenically unsaturated dicarboxylic acids with one or more dihydric alcohols, (b) 25 to 75 parts by weight of a monomer containing a $CH_2{=}C<$ group copolymerizable with said unsaturated polyester and (c) 1 to 25 parts by weight of a cellulose ester and molding and curing said polymerizable composition of matter in the presence of fibrous reinforcement under heat and pressure, the sum total of (a), (b) and (c) being 100 parts by weight.

17. The method of claim 16, wherein the fibrous reinforcement is a glass material.

18. A method according to claim 17 wherein there is also present an inert, inorganic filler.

19. A liquid, polymerizable composition of matter, suitable for molding glass fibrous reinforced articles with a smooth surface, said composition being curable under heat and pressure to form a rigid, cured product which is characterized by an optically heterogeneous appearance, comprising per 100 parts by weight (a) 30 to 50 parts of $\alpha,\beta$-ethylenically unsaturated polymerizable polyester having a molecular weight per double bond factor of 150 to 186, and (b) 40 to 60 parts of a monomer containing a $$CH_2{=}C<$$

group copolymerizable with said unsaturated polyester and (c) 5 to 20 parts of a cellulose ester which is soluble in monomer (b), or in a solution of unsaturated polyester (a) in monomer (b), but which, when present during the copolymerization of (a) and (b), yields an optically heterogeneous cured composition, the sum total of (a), (b) and (c) being 100 parts by weight.

20. A liquid, polymerizable composition of matter according to claim 19 wherein the unsaturated polymerizable polyester is (a) the condensation product of propylene glycol and maleic anhydride, the monomer (b) is styrene and the thermoplastic polymer (c) is cellulose acetate butyrate.

21. A liquid, polymerizable composition of matter according to claim 1, wherein the $\alpha,\beta$-ethylenically unsaturated polyester (a) is the condensation product of unsaturated dicarboxylic acids chosen from the group consisting of maleic and fumaric acids and the dihydric alcohol is propylene glycol with up to 50 mole percent replaced by another diol.

*22. A homogeneous polyester resin system which comprises per 100 parts by weight about 1 to about 25 parts by weight of a cellulose organic ester and selected from the group consisting of cellulose propionate, cellulose acetate propionate, and cellulose acetate butyrate; from about 25 to about 75 parts by weight of a monomeric copolymerizable component containing a $CH_2{=}C<$ group; and from about 20 to about 70 parts by weight of an unsaturated polyester resin component having a molecular weight to double bond factor of 150 to 186, said unsaturated polyester resin being the condensation product obtained by polycondensation of $\alpha,\beta$-unsaturated dicarboxylic acid and/or anhydrides together with polyhydric alcohol.*

*23. The resin system of claim 22 wherein the monomeric copolymerizable component is styrene.*

*24. The resin system of claim 22 having therein an effective amount of a polymerization initiator whereby upon curing of the resinous system, surfaces are characterized as smooth, free of ripple and shrink marks, with excellent adhesion to paints.*

*25. The resin system of claim 22 wherein the $\alpha,\beta$-unsaturated dicarboxylic acid is selected from the group consisting of maleic acid, maleic anhydride, fumaric acids and citraconic acid.*

*26. The resin system of claim 22 wherein the polyhydric alcohol is selected from the group consisting of ethylene glycol; propanediol-1,2; butanediol-1,3; diethylene glycol and dipropylene glycol.*

*27. A cured product cured by exposing the resin system of claim 22 to a temperature from about 212° F. to about 350° F. and pressures in the range of from 100 to 1,500 psi.*

*28. A method for preparation of a homogeneous polyester resin system which comprises mixing together per 100 parts by weight about 1 to about 25 parts by weight of a cellulose organic ester selected from the group consisting of cellulose propionate, cellulose acetate propionate, and cellulose acetate butyrate; which is added with agitation to about 25 to about 75 parts by weight of a monomeric copolymerizable component containing a $CH_2{=}C<$ group; and thereafter, adding from about 20 to about 70 parts by weight of unsaturated polyester resin, the unsaturated polyester resin having a molecular weight to double bond factor of 150 to 186 and being the condensation product obtained by polycondensation of $\alpha,\beta$-unsaturated dicarboxylic acid and/or anhydrides together with polyhydric alcohol.*

*29. The method of claim 28 wherein the monomeric copolymerizable component is styrene.*

*30. The method for preparation of a resin system of claim 28 wherein the $\alpha,\beta$-unsaturated dicarboxylic acid is selected from the group consisting of maleic acid, maleic anhydride, fumaric acids, and citraconic acid.*

*31. The method for preparation of a resin system of claim 28 wherein the polyhydric alcohol is selected from the group consisting of ethylene glycol; propanediol-1,2; butanediol-1,3; diethylene glycol and dipropylene glycol.*

* * * * *